United States Patent
Qian et al.

(10) Patent No.: US 8,184,973 B2
(45) Date of Patent: May 22, 2012

(54) DIRECT DETECTION FOR RECEIVING POLARIZATION MULTIPLEXING SIGNALS

(75) Inventors: Dayou Qian, Plainsboro, NJ (US); Lei Xu, Princeton, NJ (US); Junqiang Hu, Princeton, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 629 days.

(21) Appl. No.: 12/371,233

(22) Filed: Feb. 13, 2009

(65) Prior Publication Data

US 2009/0202243 A1    Aug. 13, 2009

Related U.S. Application Data

(60) Provisional application No. 61/028,267, filed on Feb. 13, 2008.

(51) Int. Cl.
*H04J 14/06* (2006.01)
*H04B 10/158* (2006.01)

(52) U.S. Cl. .......................................... 398/65; 398/202
(58) Field of Classification Search ................... 398/65, 398/202
See application file for complete search history.

(56) References Cited

U.S. PATENT DOCUMENTS

| 7,742,536 | B2 * | 6/2010 | Burg et al. ..................... 375/260 |
| 7,860,406 | B2 * | 12/2010 | Xie ................................. 398/205 |
| 2008/0138070 | A1 * | 6/2008 | Yan et al. ........................ 398/65 |
| 2008/0232816 | A1 * | 9/2008 | Hoshida et al. ............... 398/152 |
| 2009/0074415 | A1 * | 3/2009 | Xie ................................. 398/79 |

* cited by examiner

*Primary Examiner* — Leslie Pascal
(74) *Attorney, Agent, or Firm* — Paul Schwarz; Joseph Kolodka

(57) ABSTRACT

There is provided a method for detecting optical signals comprising employing a photo diode to both directly detect a received optical signal and convert it into an electrical signal for recovery of data bit stream information in the received optical signal, the received optical signal being derived from a separation of two polarization multiplexed optical signals that were combined before being received.

13 Claims, 1 Drawing Sheet

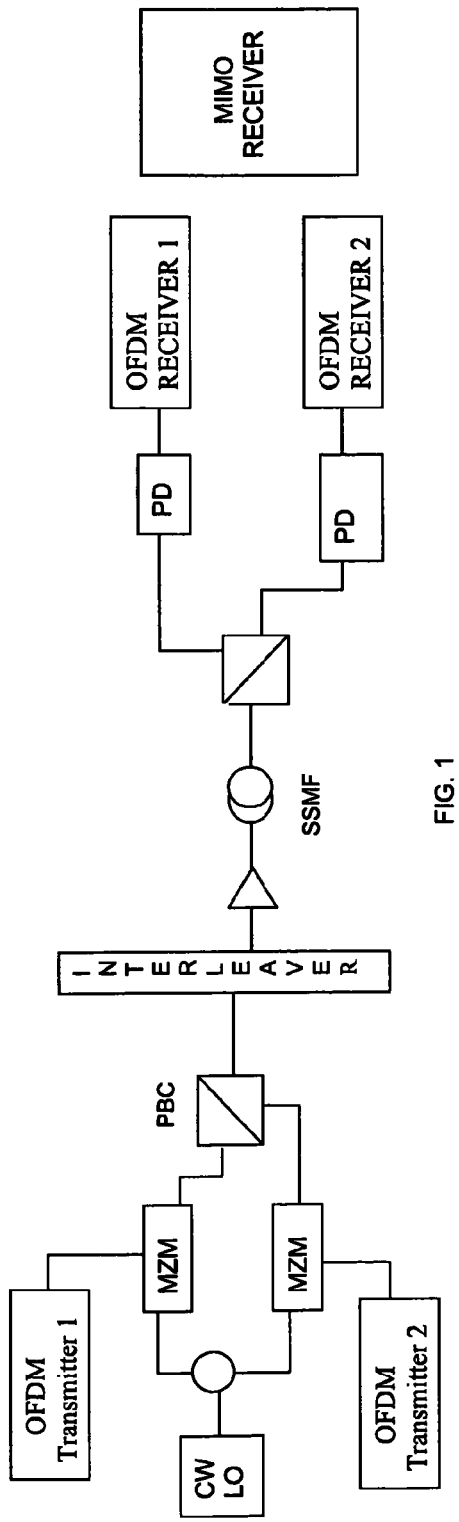
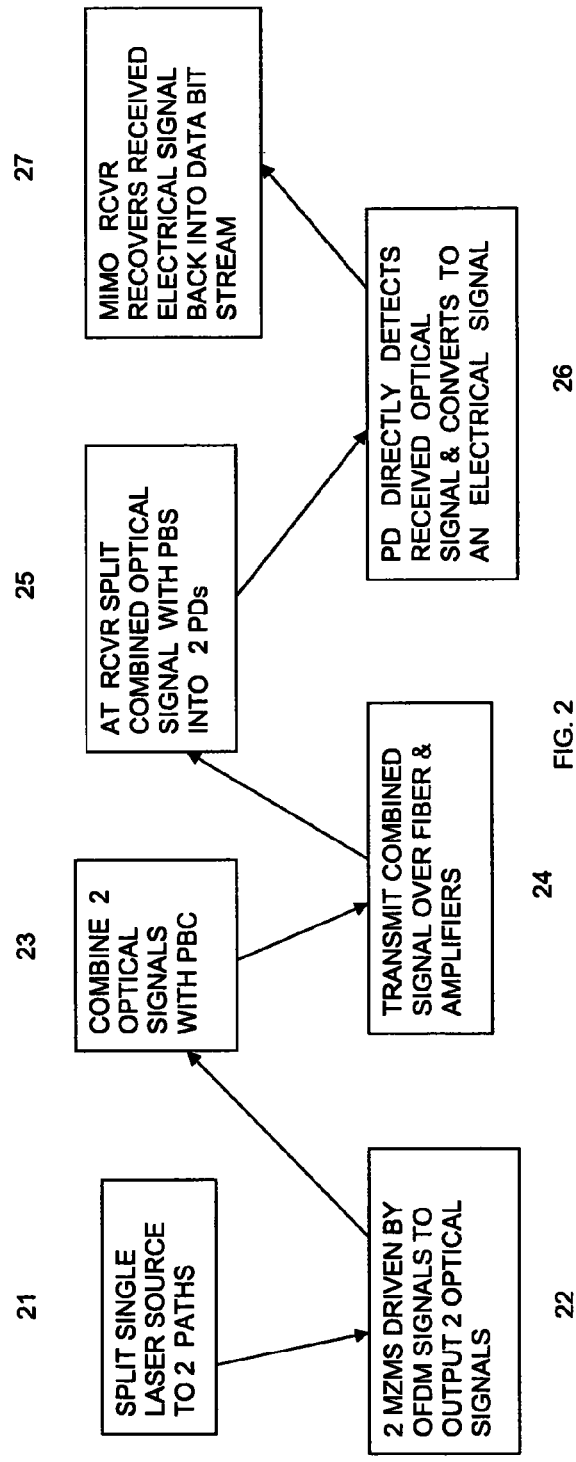

DIRECT DETECTION FOR RECEIVING POLARIZATION MULTIPLEXING SIGNALS

This application claims the benefit of U.S. Provisional Application No. 61/028,267, entitled "40-Gb/s MIMIO-OFDM-PON Using Direct Detection", filed on Feb. 13, 2008.

The present invention relates generally to broadband communications, and more particularly, to direct detection of polarization multiplexing OFDM signals.

BACKGROUND OF THE INVENTION

Fueled by exponentially growing demand for broadband services, the transport capacity of next-generation optical access networks will migrate to 40 Gb/s per channel in the near future. However, unlike long haul networks whose the distance-bandwidth product is large enough to leverage high implementation cost, access networks (<100 km) must maintain low hardware and operation costs to remain attractive and practical.

It is well known that in 40 Gb/s optical links, fiber dispersion can severely limit transmission distance. Orthogonal Frequency Division Multiplexing (OFDM) has recently emerged as a very promising modulation format for high-speed optical transmission due to both high resistance to fiber dispersion (both CD and PMD) and high spectral efficiency. By thus eliminating the need for dispersion compensation and reducing the transmission bandwidth, OFDM can significantly increase flexibility of access passive optical networks (PON) while reducing implementation cost. However, since an OFDM signal can only be generated by high speed digital-to-analog converters (DAC), current DAC technology with maximum sample rate of 10 Gsample/s at 8-bit resolution (256 levels) limits OFDM bandwidth to 5 GHz. In order to generate a 40-Gb/s OFDM signal in a 5 GHz bandwidth, 256-QAM modulation would have to be used, yet currently, it cannot be realized at 8-bit DAC resolution. Polarization-Multiplexing (POLMUX), wherein a high-speed OFDM signal is carried in two orthogonal polarizations, has been widely proposed in long-haul OFDM transmission as a spectrally-efficient alternative to generating very high-speed signals. The trade-off in such multiple-input multiple-output (MIMO) POLMUX systems is the need for coherent detection which entails narrow line width lasers and complex frequency-offset and phase noise compensation algorithms that are too costly for access networks.

Accordingly, there is a need for a method that circumvents the above noted difficulties by exploiting polarization multiplexing POLMUX with direct-detection to realize 40 Gb/s transmission over 20 km standard single mode fiber SSMF.

SUMMARY OF THE INVENTION

There is provided a method for detecting optical signals including employing a photo diode to both directly detect a received optical signal and convert it into an electrical signal for recovery of data bit stream information in the received optical signal, the received optical signal being derived from a separation of two polarization multiplexed optical signals that were combined before being received.

In accordance with an alternative aspect of the invention, an optical receiver including a polarization beam splitter for separating out at least a first and second optical signal from a combination of at least two optical signals having been combined by polarization multiplexing; and at least a first and second photo diode for respectively detecting and converting the first and second optical signal into corresponding first and second electrical signals.

BRIEF DESCRIPTION OF DRAWINGS

These and other advantages of the invention will be apparent to those of ordinary skill in the art by reference to the following detailed description and the accompanying drawings.

FIG. 1 is a block diagram of an exemplary OFDM transmission employing direct detection in accordance with the invention.

FIG. 2 is a diagram illustrating transmission and direct detection of polarization multiplexed OFDM signals in accordance with the invention.

DETAILED DESCRIPTION

The invention is directed to an inventive MIMO OFDM PON configuration that circumvents the above difficulties with coherent detection by employing an inventive POLMUX with direct-detection to realize 40 Gb/s transmission over 20 km SSMF. With the inventive approach, two 20-Gb/s OFDM signals are combined by a polarization beam combiner (PBC) at the central office (CO), split at the receiver by a polarization beam splitter (PBS) and direct-detected by two photodiodes. Only 10-Gb/s components were used in the experiment. The 16-QAM modulation format is used on both 5 GHz OFDM signals, enabling 40-Gb/s transmission using only low cost 10 Gb/s components.

FIG. 1 shows a schematic diagram of proposed MIMO-OFDM PON featuring the inventive POLMUX and direct-detection. At the central office CO, baseband 5 GHz OFDM signals are generated by standard OFDM modulators (OFDM Transmitter 1, OFDM Transmitter 2), and used to drive two Mach-Zehnder intensity modulators (MZM), biased by a single continuous wave CW DFB laser. The resulting optical OFDM signals are aggregated through a polarization beam combiner PBC, then an EDFA or interleaver (shown) used to adjust the output optical power.

After standard single mode fiber SSMF transmission, a polarization beam splitter PBS is used to separate the incoming optical signal into two orthogonal polarizations, which are photo detected by two separate photodiodes PD, generating two electrical OFDM signals. It is noted that because the optical carrier transmitted with each optical OFDM signal maintains the same phase and polarization as the OFDM signal, it is effectively used by the photo detector as the local oscillator (LO) during OFDM optoelectronic conversion. This way, a separate LO, an optical phase lock loop (PLL) and a polarization controller that would all be required in coherent detection are eliminated from the receivers. Moreover, because the optical carrier is used as a LO, phase noise is minimized enabling the use of conventional DFB lasers.

Finally, as shown in FIG. 1, the two received electrical OFDM signals from the OFDM receivers (OFDM Receiver 1, OFDM Receiver 2 shown) are sent to the MIMO-OFDM processor. The MIMO-OFDM receiver consists of two conventional OFDM receivers wherein MIMO processing is applied on a per-subcarrier basis. Specifically, after OFDM symbol synchronization, channel estimation is performed for both received polarizations by comparing the received per-subcarrier symbols at both received polarizations with the transmitted OFDM training symbol. In order to distinguish the training symbols of the individual POLMUX tributaries, two arbitrary waveform generators (AWGs) used to generate the OFDM signals are synchronized so as to alternate in training symbol transmission. The influence of ASE noise is minimized by averaging over 44 received symbols. Following cyclic prefix and training sequence removal and the FFT zero-forcing MIMO processing (channel equalization) is applied by which the OFDM signal is multiplied with the inverse of the estimated channel matrix to obtain an estimate of the transmitted symbol vector. Although more advanced MIMO detectors have been proposed, they would exert additional cost via higher computational complexity; consequently, a simpler method is adopted here.

The inventive POLMUX with direct-detection has been used experimentally to demonstrate a 40 Gb/s MIMO-OFDM PON architecture for optical access networks based on POLMUX and direct detection that is capable of superior performance over 20 km SSMF. The inventive approach significantly reduces implementation cost and complexity by both eliminating the need for elaborate receiver-end hardware mandated by coherent detectors and by using only 10-Gb/s components, including conventional DFB lasers, to achieve the 40-Gb/s data rate. As such, the introduced architecture may be viewed as a highly attractive candidate for next-generation optical access networks.

Referring to FIG. 2, a diagram is presented illustrating transmission and direct detection of polarization multiplexed OFDM signals in accordance with the invention. One single CW laser source (DBF) 21 is split into two paths and goes to two Mach-Zehnder modulators (MZM). Two Mach-Zehnder modulators (MZM) are driven by two OFDM signals 22. Two optical output signals are combined 23 by a polarization beam. splitter/combiner (PBS). The combined signal after passing through an interleaver is transmitted through fiber and amplifiers 24. At the receiver side, the optical signal is split by another PBS 25 and goes into two photo diodes (PD) 25. The PD directly detects the received optical signal and converts it to electrical signal 26. An OFDM zero forcing MIMO receiver recovers the received electrical signals back to data bit streams 27.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations, which although not explicitly shown or described herein, embody the principles of the invention and are within their spirit and scope.

What is claimed is:

1. A method for detecting optical signals, the method comprising:
    receiving a single laser generated signal at a polarization beam splitter, the signal comprising two polarization multiplexed optical signals, the signal received at the polarization beam splitter without polarization control processing;
    separating the two polarization multiplexed optical signals into first and second optical signals;
    directly detecting one of the first and second optical signals with a first photo diode;
    converting the directly detected one of the first and second optical signals into a first electrical signal with the first photo diode; and
    recovering data bit stream information in the one of the first and second optical signals from the first electrical signal.
2. The method of claim 1, wherein the separating is performed by a polarization beam splitter.
3. The method of claim 1, wherein the recovering of the data bit stream information is performed by an OFDM zero forcing receiver which derives the data bit stream information from the electrical signal.
4. The method of claim 1, wherein the recovering of the data bit stream information is performed by an OFDM receiver.
5. The method of claim 1, further comprising:
    directly detecting the other one of the first and second optical signals with a second photo diode;
    converting the directly detected other one of the first and second optical signals into a second electrical signal with the second photo diode; and
    recovering data bit stream information in the other one of the first and second optical signals from the second electrical signal.
6. The method of claim 5, further comprising:
    receiving the data bit stream information recovered from the first and second electrical signals with a multiple input multiple output MIMO receiver; and
    recovering channel equalization from the data bit stream information.
7. An optical receiver comprising:
    a polarization beam splitter for:
        receiving a single laser generated signal comprising two polarization multiplexed optical signals without polarization control processing; and
        separating the two polarization multiplexed optical signals into first and second optical signals;
    and
    at least first and second photo diodes for respectively detecting and converting the first and second optical signals into corresponding first and second electrical signals.
8. The optical receiver of claim 7, further comprising respective first and second OFDM receivers for recovering data bit stream information from the first and second electrical signals.
9. The optical receiver of claim 7, further comprising a multiple input multiple output receiver for processing data bit stream information recovered from the first and second electrical signals to provide channel equalization.
10. An optical network system comprising:
    a single laser;
    two intensity modulators, each of which is biased by the single laser and driven by one of two electrical signals to generate an optical signal;
    a polarization beam combiner (PBC) for aggregating the two optical signals into a polarization multiplexed (POLMUX) signal;
    a polarization beam splitter (PBS) for receiving the POLMUX signal without polarization control processing and separating the POLMUX signal into the two optical signals; and
    two photodiodes, each of which detects one of the two optical signals at an output of the PBS and generates an electrical signal.
11. The optical network system of claim 10, wherein each of the two intensity modulator comprises an Orthogonal Frequency Division Multiplexing (OFDM) intensity modulator.
12. The optical network system of claim 10, further comprising two OFDM receivers, each of which receives one of the electrical signals.
13. The optical network system of claim 12, further comprising a multiple-input multiple-output (MIMO) receiver.

* * * * *